United States Patent
McGaughey et al.

(10) Patent No.: US 11,595,523 B2
(45) Date of Patent: *Feb. 28, 2023

(54) WEB WIDGET THAT FACILITATES TELEPHONE CALLS WITH CUSTOMER-SUPPORT AGENTS AND OTHER CUSTOMER-SUPPORT SERVICES

(71) Applicant: Zendesk, Inc., San Francisco, CA (US)

(72) Inventors: Barry McGaughey, Dublin (IE);
Anatoly Mikhaylov, Dublin (IE);
Nathan P. Thiesen, Dublin (IE);
Gerard J. Cahill, Dublin (IE);
Anthony Del Ciotto, Victoria (AU);
Daniel Angel Bradford, Grange (AU)

(73) Assignee: Zendesk, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,895

(22) Filed: Apr. 20, 2022

(65) Prior Publication Data
US 2022/0247865 A1 Aug. 4, 2022

Related U.S. Application Data

(63) Continuation of application No. 17/216,011, filed on Mar. 29, 2021, now Pat. No. 11,343,379, which is a
(Continued)

(51) Int. Cl.
*H04M 3/51* (2006.01)
*G06Q 10/06* (2012.01)
(Continued)

(52) U.S. Cl.
CPC .. *H04M 3/5191* (2013.01); *G06Q 10/063114* (2013.01); *G06Q 30/016* (2013.01);
(Continued)

(58) Field of Classification Search
None
See application file for complete search history.

(56) References Cited

U.S. PATENT DOCUMENTS 10,992,810 B2 * 4/2021 McGaughey ....... H04M 3/5231
11,343,379 B2 * 5/2022 McGaughey ....... H04M 7/0033
(Continued)

*Primary Examiner* — Harry S Hong
(74) *Attorney, Agent, or Firm* — Park, Vaughan, Fleming & Dowler LLP

(57) ABSTRACT

A system and method for providing customer-support services to a user of a website through a web widget. When the user accesses a web page containing the web widget, a call is automatically made from the web widget to a customer-support system. In response to the call, the system obtains status information from the customer-support system indicating whether customer-support agents are available to take telephone phone calls. If the status information indicates customer-support agents are available to take telephone calls, the web widget provides a call-related interface to the user, wherein the call-related interface is configured to facilitate a telephone call with a customer-support agent. If the status information indicates customer-support agents are not available to take telephone calls, the web widget provides a non-call-related interface to the user, wherein the non-call-related interface is configured to facilitate an alternative channel of customer support that does not involve a telephone call.

22 Claims, 5 Drawing Sheets

Related U.S. Application Data continuation of application No. 16/414,545, filed on May 16, 2019, now Pat. No. 10,992,810.

(60) Provisional application No. 62/672,492, filed on May 16, 2018.

(51) Int. Cl.
  *H04M 3/523* (2006.01)
  *H04M 7/00* (2006.01)
  *G06Q 30/00* (2012.01)
  *G06Q 10/0631* (2023.01)
  *G06Q 30/016* (2023.01)

(52) U.S. Cl.
  CPC ....... *H04M 3/5231* (2013.01); *H04M 3/5235* (2013.01); *H04M 7/0033* (2013.01)

(56) References Cited

U.S. PATENT DOCUMENTS

| | | | | |
|---|---|---|---|---|
| 2014/0161241 | A1* | 6/2014 | Baranovsky | H04L 61/5061 |
| | | | | 379/142.04 |
| 2018/0276723 | A1* | 9/2018 | Kannan | H04L 51/214 |
| 2019/0356780 | A1* | 11/2019 | McGaughey | H04M 7/0033 |
| 2021/0218841 | A1* | 7/2021 | McGaughey | H04M 3/5231 |

* cited by examiner

WEB WIDGET THAT FACILITATES TELEPHONE CALLS WITH CUSTOMER-SUPPORT AGENTS AND OTHER CUSTOMER-SUPPORT SERVICES

RELATED APPLICATIONS

This application is a continuation of U.S. patent application Ser. No. 17/216,011 (the '011 application), which was filed Mar. 29, 2021. The '011 application is a continuation of U.S. patent application Ser. No. 16/414,545, which was filed May 16, 2019 and issued Apr. 27, 2021 as U.S. Pat. No. 10,992,810. Also, this application claims the benefit under 35 U.S.C. § 119 of U.S. Provisional Patent Application No. 62/672,492, entitled "Web Widget," which was filed May 16, 2018. The contents of the identified patent applications and provisional patent application are incorporated herein by reference.

BACKGROUND

Field

The disclosed embodiments generally relate to computer-based systems that manage customer-support interactions. More specifically, the disclosed embodiments relate to the design of a web widget that facilitates telephone calls with customer-support agents and other customer-support services.

Related Art

As electronic commerce continues to proliferate, customers are beginning to use online customer-support resources to resolve problems, and to obtain information related to various products or services. These online customer-support resources commonly include customer-support systems, which help customers resolve their problems, either by providing information to the customers, or by facilitating interactions with customer-support agents. When designed properly, these customer-support systems can automate customer-support interactions, thereby significantly reducing a company's customer-support-related expenses.

Website designers typically make customer-support resources easily accessible within their websites. However, this typically involves a significant amount of programming to integrate functionality from a customer-support API, which is often obtained from a third-party provider, into a website. The same API is typically used by many websites to perform similar functions. Hence, it may be possible to avoid much of the manual programming effort involved in integrating customer-support resources into a website if the same integration-related code can be used across multiple websites.

Customer support resources can also be provided through multiple channels, such as: user-fillable forms; an online chat session with a customer-support agent; a telephone call with a customer-support agent; and self-service help involving user-initiated searches through a customer-support knowledge base. However the availability of these channels can change over time as the availability of customer-support agents changes. This makes it challenging to produce a customer-support interface, which effectively integrates the changing customer-support channels into a coherent user experience.

Hence, what is needed is a method for effectively integrating customer-support resources into a website without requiring a significant amount of programming effort.

SUMMARY

The disclosed embodiments relate to a system that provides customer-support services to a user of a website through a web widget. When the user accesses a web page containing the web widget, the system automatically makes a call from the web widget to a customer-support system. In response to the call, the system obtains status information from the customer-support system, wherein the status information indicates whether customer-support agents are available to take telephone phone calls. If the status information indicates customer-support agents are available to take telephone calls, the web widget provides a call-related interface to the user, wherein the call-related interface is configured to facilitate a telephone call with a customer-support agent. If the status information indicates customer-support agents are not available to take telephone calls, the web widget provides a non-call-related interface to the user, wherein the non-call-related interface is configured to facilitate an alternative channel of customer support that does not involve a telephone call.

In some embodiments, the call-related interface enables the user to enter a telephone number to receive a callback from a customer-support agent.

In some embodiments, when the user makes a callback request through the call-related interface, the customer-support system enqueues the callback request, wherein the callback request will to be sent to a next available customer-support agent when the callback request reaches a top of the queue.

In some embodiments, the call-related interface provides the user with a telephone number that the user can dial to speak with a customer-support agent.

In some embodiments, the customer-support system is architected to include a talk embeddable service, which mediates communications between numerous web widgets and an underlying voice application.

In some embodiments, the talk embeddable service consolidates requests from web widgets and also verifies that the requests are legitimate before forwarding the requests to the underlying voice application.

In some embodiments, the system receives updated configuration information at the web widget, wherein the updated configuration information was entered by an administrator through an admin interface. Next, the system reconfigures the web widget based on the updated configuration information.

In some embodiments, the web widget provides omnichannel access to the customer-support system.

In some embodiments, the omnichannel access facilitates the following types of communication between the user and the customer-support system: a user-fillable form to communicate with the customer-support system; an online chat session with a customer-support agent; a telephone call with a customer-support agent; and access to a self-service help system, which facilitates user-initiated searches through a customer-support knowledge base.

In some embodiments, the web widget makes the call to the customer-support system through a connection to a web socket interface provided by the customer-support system.

In some embodiments, the customer-support system places limits on: a number of requests that can originate from the same IP address within a given time interval; a number of calls a user can make from the same telephone number within a given time interval; and a number of callback requests a user can make to the same telephone number within a given time interval.

In some embodiments, the customer-support system prevents a user from simultaneously enqueuing multiple calls or multiple callback requests.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
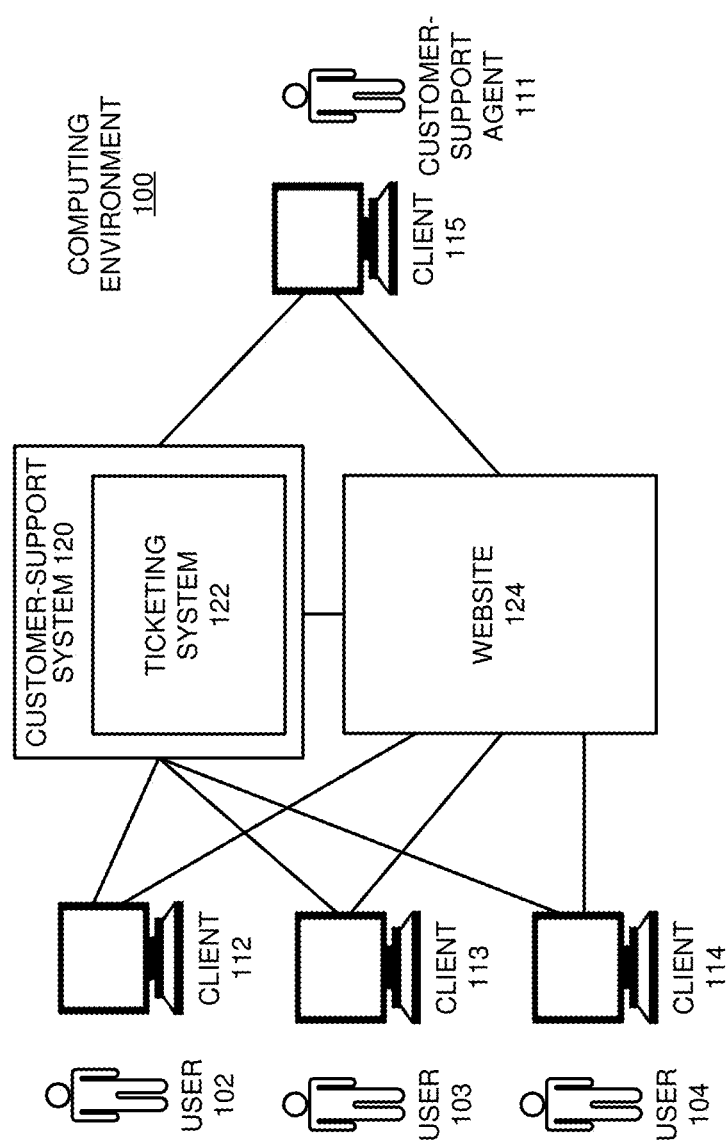
FIG. 1 illustrates a computing environment including an application and an associated customer-support system in accordance with the disclosed embodiments.

Before describing the web widget in more detail, we first describe a computing environment in which it operates. FIG. 1 illustrates a computing environment 100 including a website 124 and an associated customer-support system 120 in accordance with the disclosed embodiments. Within computing environment 100, a number of users 102-104 interact with website 124 through client computer systems 112-114, respectively. Website 124 is provided by an organization, such as a commercial enterprise, to enable users 102-104 to perform various operations associated with the organization, or to access one or more services provided by the organization. For example, website 124 can provide online accounting software that users 102-104 can access to prepare and file tax returns online. In another example, website 124 provides a commercial website for selling sporting equipment. Note that website 124 can be hosted on a local or remote server.

If users 102-104 have problems or questions about transactions on website 124, they can access customer-support system 120 to obtain help in dealing with issues, which can include various problems and questions. For example, a user of accounting software may need help in using a feature of the accounting software, or a customer of a website that sells sporting equipment may need help in cancelling an order that was erroneously entered. This help may be provided by a customer-support agent 111 who operates a client computer system 115 and interacts with users 102-104 through customer-support system 120. This help may also comprise automatically suggested helpful articles that the customer can read to hopefully resolve the problem or question. Note that a customer-support agent 111 can access website 124 (either directly or indirectly through help center 120) to help resolve an issue.

Customer-support system 120 organizes customer issues using a ticketing system 122, which generates tickets to represent each customer issue. Ticketing systems are typically associated with a physical or virtual "help center" (or "help desk") for resolving customer problems. Note that, although the present invention is described with reference to a ticketing system, it is not meant to be limited to customer-support interactions involving ticketing systems. In general, the invention can be applied to any type of system that enables a customer to resolve a problem with a product or service provided by an organization.

Ticketing system 122 generally comprises a set of software resources that enable a customer to resolve an issue. In the illustrated embodiment, specific customer issues are associated with abstractions called "tickets," which encapsulate various data and metadata associated with the customer requests to resolve an issue. (Within this specification, tickets are more generally referred to as "customer requests.") An exemplary ticket can include a ticket identifier, and information (or links to information) associated with the problem. For example, this information can include: (1) information about the problem; (2) customer information for one or more customers who are affected by the problem; (3) agent information for one or more customer-support agents who are interacting with the customer; (4) email and other electronic communications about the problem (which, for example, can include a question posed by a customer about the problem); (5) information about telephone calls associated with the problem; (6) timeline information associated with customer-support interactions to resolve the problem, including response times and resolution times, such as a first reply time, a time to full resolution and a requester wait time; and (7) effort metrics, such as a number of communications or responses by a customer, a number of times a ticket has been reopened, and a number of times the ticket has been reassigned to a different customer-support agent.

Web Widget

Figure 2A:
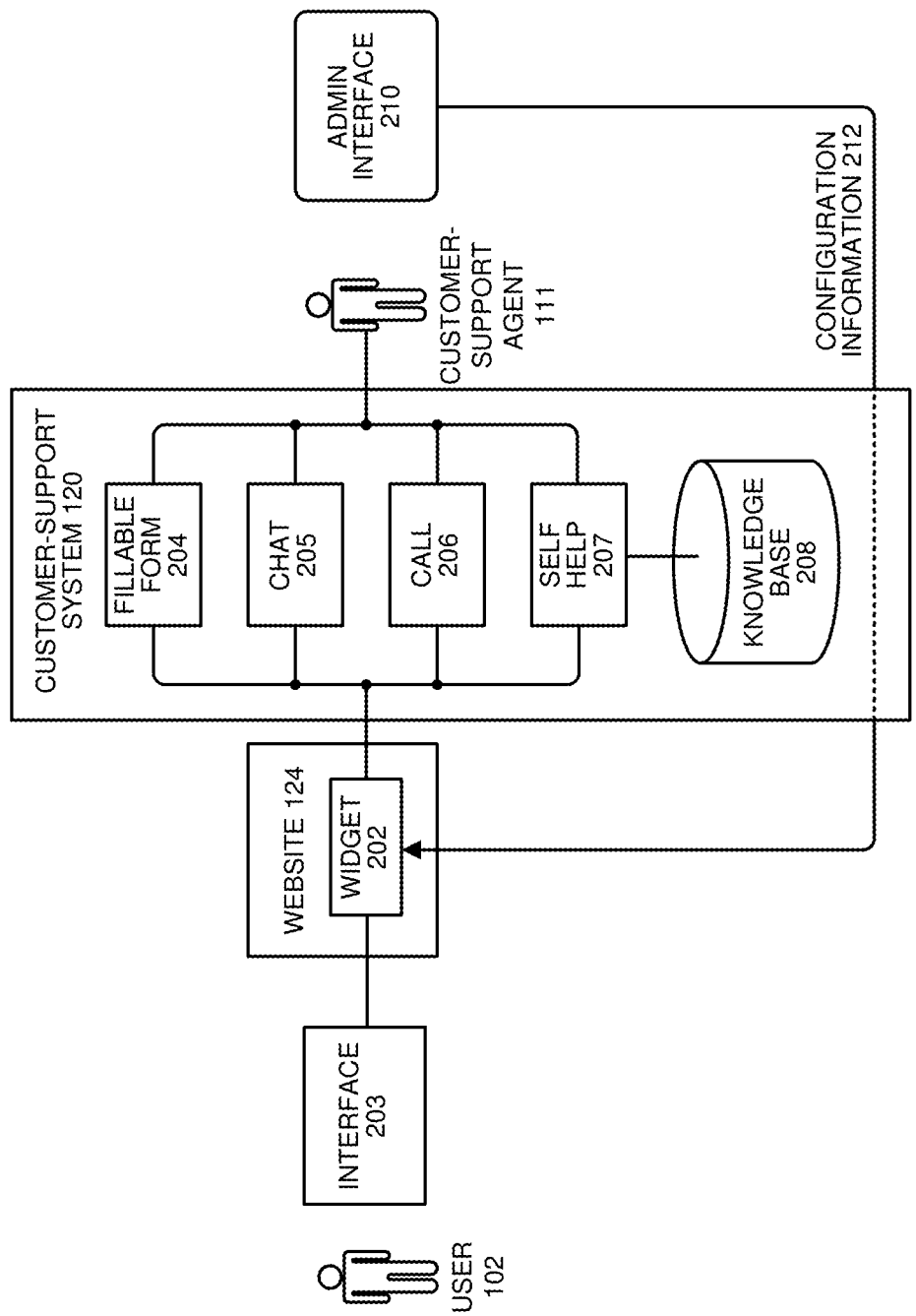
FIG. 2A illustrates how a web widget in a website provides access to multiple customer-support channels in accordance with the disclosed embodiments.

FIG. 2A illustrates how a web widget 202 in a website 124 provides access to multiple customer-support channels in accordance with the disclosed embodiments. As illustrated in FIG. 2A, a user 102 who is accessing a website 124 can use an interface 203 provided by a web widget 202 to access multiple customer-support channels, including: a user-fillable form 204, which is sent to customer-support agent 111; an online chat 205 session with a customer-support agent 111; a telephone call 206 with a customer-support agent 111; and self help 207 involving user-initiated searches through a customer-support knowledge base 208.

By presenting a specifically configured interface 203 to user 102, web widget 202 controls how user 102 accesses customer-support channels 204-207. Moreover, customer-support agent 111 is able to control how the channels are accessed through interface 203 by interacting with an admin interface 210, which can be used to send configuration information 212 to web widget 202 to configure various settings for web widget 202.

Figure 2D:
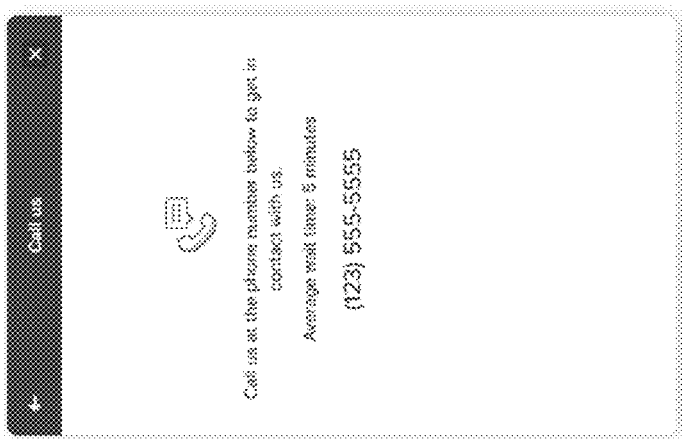
FIG. 2D illustrates a call-us interface in accordance with the disclosed embodiments.
Figure 2C:
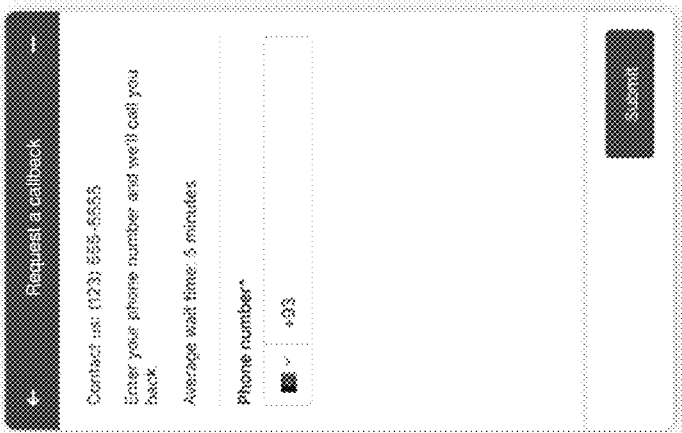
FIG. 2C illustrates a callback interface in accordance with the disclosed embodiments.
Figure 2B:
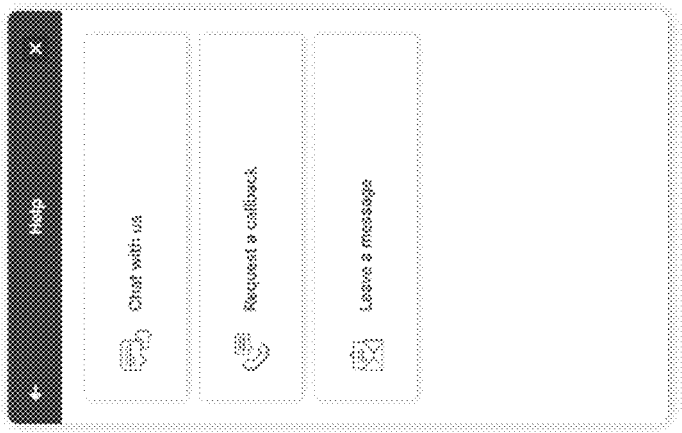
FIG. 2B illustrates a channel choice menu in accordance with the disclosed embodiments.

For example, FIG. 2B illustrates a channel choice menu for web widget 202 in accordance with the disclosed embodiments. In this example, web widget 202 has been notified that customer-support agents are available to take telephone calls and to participate in online chat sessions. Then, when a user activates web widget 202 by clicking on a "launcher icon" for web widget 202, the channel choice menu illustrated in FIG. 2B is displayed to the user. As illustrated in FIG. 2B, this channel choice menu enables the user to initiate a chat session, request a callback or leave a message. Note that if customer-support agents become unavailable to take a telephone call, this channel choice menu will dynamically change to remove the request-a-callback option.

When user 102 clicks on the "request-a-callback" option in the menu in FIG. 2B, user 102 is presented with the callback interface illustrated in FIG. 2C. This callback interface enables the user to enter a telephone number to receive a return telephone call from a customer-support agent. When user 102 submits the callback request, the callback request is placed in a queue to be sent to a next available customer-support agent. This callback interface is configured to display the average wait time for callbacks, wherein this wait-time configuration option can be specified by customer-support agent 111 through admin interface 210. The average wait time for callbacks may be automatically calculated by the customer support system.

In another example, if customer-support agent 111 deactivates the chat option and the leave-a-message option through admin interface, and also if customer-support agents are available to take telephone calls, web widget 202 only presents talk options to user 102, such as the call-us interface illustrated in FIG. 2D. This call-us interface displays a customer-support telephone number to user 102. When user 102 dials this number, user 102 will be enqueued to speak with a customer-support agent. Note that web widget 202 can be configured to display either the call-us interface or the callback interface depending on details of an underlying service-level agreement.

Talk Embeddable Service

Figure 3:
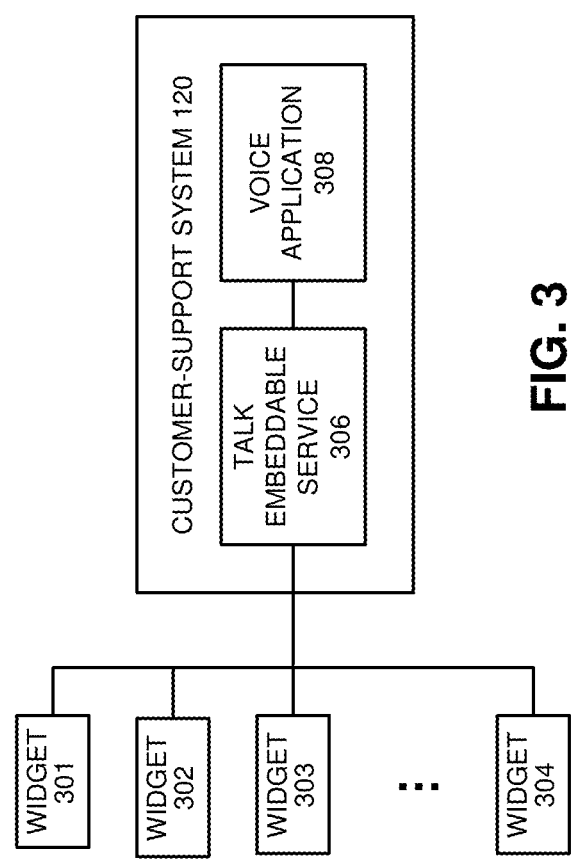
FIG. 3 illustrates a talk embeddable service that mediates communications between numerous web widgets and an underlying voice application in accordance with the disclosed embodiments.

FIG. 3 illustrates a talk embeddable service 306 that mediates communications between numerous web widgets 301-304 and an underlying voice application 308 in accordance with the disclosed embodiments. Talk embeddable service 306 protects voice application 306 by providing a defensive layer, which protects voice application 308 from a potentially large volume of traffic from web widgets 301-304. This protection can be important because many thousands or even millions of web widgets may be simultaneously trying to access voice application 308, which can create a large volume of traffic that will potentially overwhelm voice application 308.

During operation, talk embeddable service 306 exposes a web socket interface that widgets 301-304 can connect to. These connections enable web widgets 301-304 to receive the latest state information from customer-support system 120, and also to receive widget configuration updates entered by a customer-support agent 111 through admin interface 210. Talk embeddable service 306 consolidates requests from web widgets 301-304, and also makes certain that the requests are legitimate. For example, talk embeddable service 306 can check to see whether telephone numbers for callback requests are valid telephone numbers.

Process for Automatically Forming Support Topics

Figure 4:
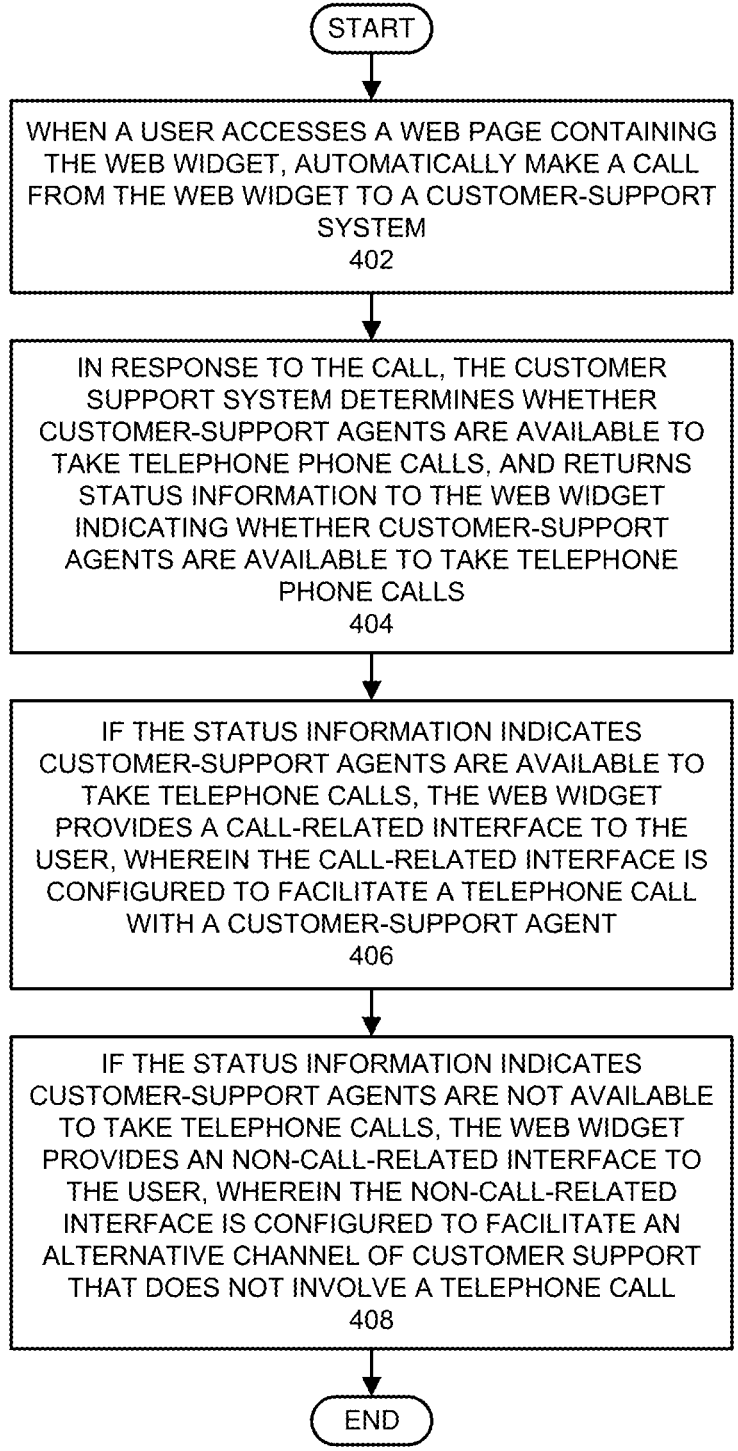
FIG. 4 presents a flowchart illustrating how a web widget can provide customer-support services to a website user in accordance with the disclosed embodiments.

FIG. 4 presents a flowchart illustrating how a web widget can provide customer-support services to a website user in accordance with the disclosed embodiments. First, when the user accesses a web page containing the web widget, the system automatically makes a call from the web widget to a customer-support system (step 402). Next, in response to the call, the customer-support system determines whether customer-support agents are available to take telephone calls, and returns status information to the web widget indicating whether customer-support agents are available to take telephone calls (step 404). Then, if the status information indicates customer-support agents are available to take telephone calls, the web widget provides a call-related interface to the user, wherein the call-related interface is configured to facilitate a telephone call with a customer-support agent (step 406). On the other hand, if the status information indicates customer-support agents are not available to take telephone calls, the web widget provides a non-call-related interface to the user, wherein the non-call-related interface is configured to facilitate an alternative channel of customer support that does not involve a telephone call (step 408).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for providing customer-support services to a user of a website through a web widget, comprising:

when the user accesses a web page containing the web widget, automatically making a call from the web widget to a customer-support system;

in response to the call, obtaining status information from the customer-support system, wherein the status information indicates whether customer-support agents are available to take telephone phone calls;

if the status information indicates customer-support agents are available to take telephone calls, providing a call-related interface to the user through the web widget, wherein the call-related interface is configured to facilitate a telephone call with a customer-support agent; and if the status information indicates customer-support agents are not available to take telephone calls, providing a non-call-related interface to the user through the web widget, wherein the non-call-related interface is configured to facilitate an alternative channel of customer support that does not involve a telephone call;

wherein the customer-support system places limits on one or more of:
a number of requests that can originate from the same IP address within a given time interval;
a number of calls a user can make from the same telephone number within a given time interval; and
a number of callback requests a user can make to the same telephone number within a given time interval.

2. The method of claim 1, wherein the call-related interface enables the user to enter a telephone number to receive a callback from a customer-support agent.

3. The method of claim 2, wherein:
when the user makes a callback request through the call-related interface, the customer-support system enqueues the callback request, and
the callback request will be sent to a next available customer-support agent when the callback request reaches a top of the queue.

4. The method of claim 1, wherein the call-related interface provides the user with a telephone number that the user can dial to speak with a customer-support agent.

5. The method of claim 1, wherein the customer-support system includes a talk embeddable service that mediates communications between numerous web widgets and an underlying voice application.

6. The method of claim 5, wherein the talk embeddable service consolidates requests from web widgets and verifies that the requests are legitimate before forwarding the requests to the underlying voice application.

7. The method of claim 1, wherein the method further comprises:
receiving updated configuration information at the web widget, wherein the updated configuration information was entered by an administrator through an admin interface; and
reconfiguring the web widget based on the updated configuration information.

8. The method of claim 1, wherein the web widget provides omnichannel access to the customer-support system.

9. The method of claim 8, wherein the omnichannel access facilitates one or more of the following types of communication between the user and the customer-support system:
a user-fillable form to communicate with the customer-support system;
an online chat session with a customer-support agent;
a telephone call with a customer-support agent; and
access to a self-service help system, which facilitates user-initiated searches through a customer-support knowledge base.

10. The method of claim 1, wherein the web widget makes the call to the customer-support system through a connection to a web socket interface provided by the customer-support system.

11. A non-transitory computer-readable storage medium storing instructions that, when executed by a computer, cause the computer to perform a method for providing customer-support services to a user of a website through a web widget, the method comprising:
when the user accesses a web page containing the web widget, automatically making a call from the web widget to a customer-support system;
in response to the call, obtaining status information from the customer-support system, wherein the status information indicates whether customer-support agents are available to take telephone phone calls;
if the status information indicates customer-support agents are available to take telephone calls, providing a call-related interface to the user through the web widget, wherein the call-related interface is configured to facilitate a telephone call with a customer-support agent; and
if the status information indicates customer-support agents are not available to take telephone calls, providing a non-call-related interface to the user through the web widget, wherein the non-call-related interface is configured to facilitate an alternative channel of customer support that does not involve a telephone call;
wherein the customer-support system places limits on one or more of:
a number of requests that can originate from the same IP address within a given time interval;
a number of calls a user can make from the same telephone number within a given time interval; and
a number of callback requests a user can make to the same telephone number within a given time interval.

12. The non-transitory computer-readable storage medium of claim 11, wherein the call-related interface enables the user to enter a telephone number to receive a callback from a customer-support agent.

13. The non-transitory computer-readable storage medium of claim 12, wherein:
when the user makes a callback request through the call-related interface, the customer-support system enqueues the callback request, and
the callback request will be sent to a next available customer-support agent when the callback request reaches a top of the queue.

14. The non-transitory computer-readable storage medium of claim 11, wherein the call-related interface provides the user with a telephone number that the user can dial to speak with a customer-support agent.

15. The non-transitory computer-readable storage medium of claim 11, wherein the customer-support system includes a talk embeddable service that mediates communications between numerous web widgets and an underlying voice application.

16. The non-transitory computer-readable storage medium of claim 15, wherein the talk embeddable service consolidates requests from web widgets and verifies that the requests are legitimate before forwarding the requests to the underlying voice application.

17. The non-transitory computer-readable storage medium of claim 11, wherein the method further comprises:

receiving updated configuration information at the web widget, wherein the updated configuration information was entered by an administrator through an admin interface; and reconfiguring the web widget based on the updated configuration information.

18. The non-transitory computer-readable storage medium of claim 11, wherein the web widget provides omnichannel access to the customer-support system.

19. The non-transitory computer-readable storage medium of claim 18, wherein the omnichannel access facilitates one or more of the following types of communication between the user and the customer-support system:
   a user-fillable form to communicate with the customer-support system;
   an online chat session with a customer-support agent;
   a telephone call with a customer-support agent; and
   access to a self-service help system, which facilitates user-initiated searches through a customer-support knowledge base.

20. The non-transitory computer-readable storage medium of claim 11, wherein the web widget makes the call to the customer-support system through a connection to a web socket interface provided by the customer-support system.

21. A system that provides customer-support services to a user of a website through a web widget, comprising:
   at least one processor and at least one associated memory; and
   a customer-support system that executes on the at least one processor, wherein during operation the customer-support system:
      automatically makes a call from the web widget to a customer-support system when the user accesses a web page containing the web widget;
      in response to the call, obtains status information from the customer-support system, wherein the status information indicates whether customer-support agents are available to take telephone phone calls;
      if the status information indicates customer-support agents are available to take telephone calls, provides a call-related interface to the user through the web widget, wherein the call-related interface is configured to facilitate a telephone call with a customer-support agent; and
      if the status information indicates customer-support agents are not available to take telephone calls, provides a non-call-related interface to the user through the web widget, wherein the non-call-related interface is configured to facilitate an alternative channel of customer support that does not involve a telephone call;
   wherein the customer-support system places limits on one or more of:
      a number of requests that can originate from the same IP address within a given time interval;
      a number of calls a user can make from the same telephone number within a given time interval; and
      a number of callback requests a user can make to the same telephone number within a given time interval.

22. A method for providing customer-support services to a user of a website through a web widget, comprising:
   receiving at a customer-support system a call from the web widget, wherein the call was automatically initiated when the user accessed a web page containing the web widget;
   in response to the call, determining whether customer-support agents are available to take telephone phone calls; and
   returning status information to the web widget, wherein:
      the status information indicates whether customer-support agents are available to take telephone phone calls;
      if the status information indicates customer-support agents are available to take telephone calls, the web widget provides a call-related interface to the user;
      the call-related interface is configured to facilitate a telephone call with a customer-support agent; and
      if the status information indicates customer-support agents are not available to take telephone calls, the web widget provides a non-call-related interface to the user, wherein the non-call-related interface is configured to facilitate an alternative channel of customer support that does not involve a telephone call;
   wherein the customer-support system places limits on one or more of:
      a number of requests that can originate from the same IP address within a given time interval;
      a number of calls a user can make from the same telephone number within a given time interval; and
      a number of callback requests a user can make to the same telephone number within a given time interval.

* * * * *